Aug. 20, 1963 G. H. BUSHWAY 3,101,043
COOKING MACHINE
Filed June 22, 1961 3 Sheets-Sheet 1
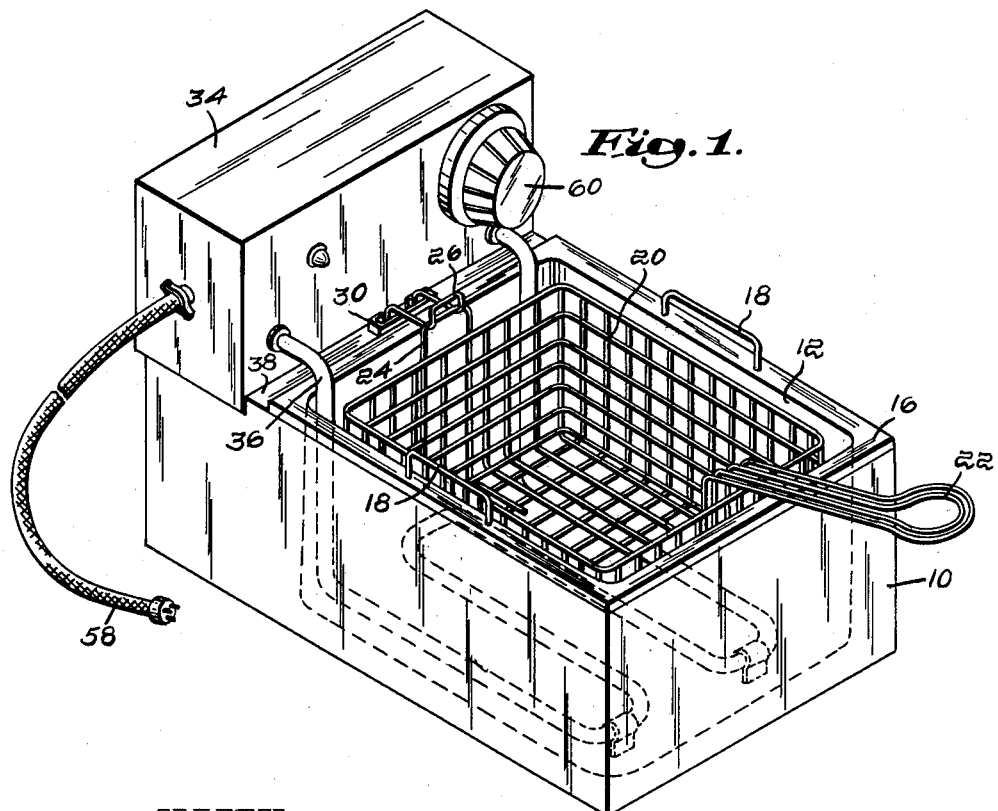
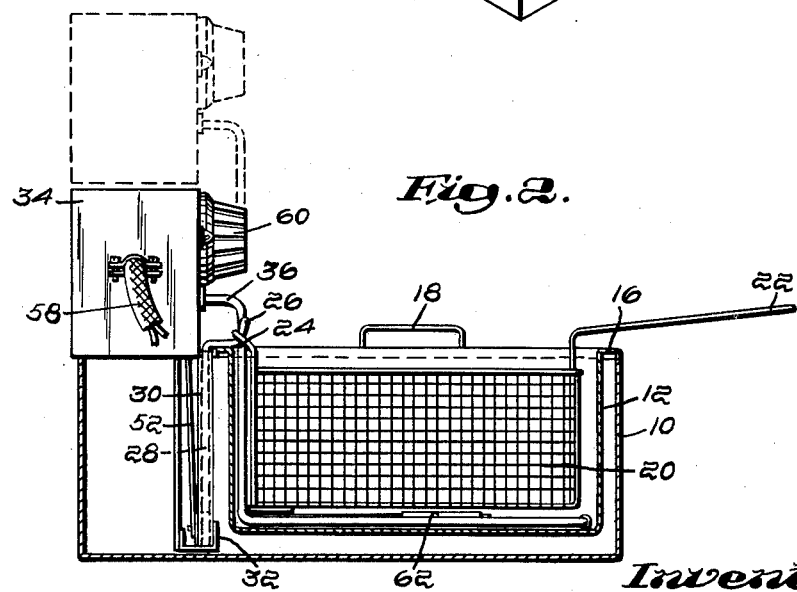
Inventor:
George H. Bushway,
by Lowrie G. Witter
Attorney

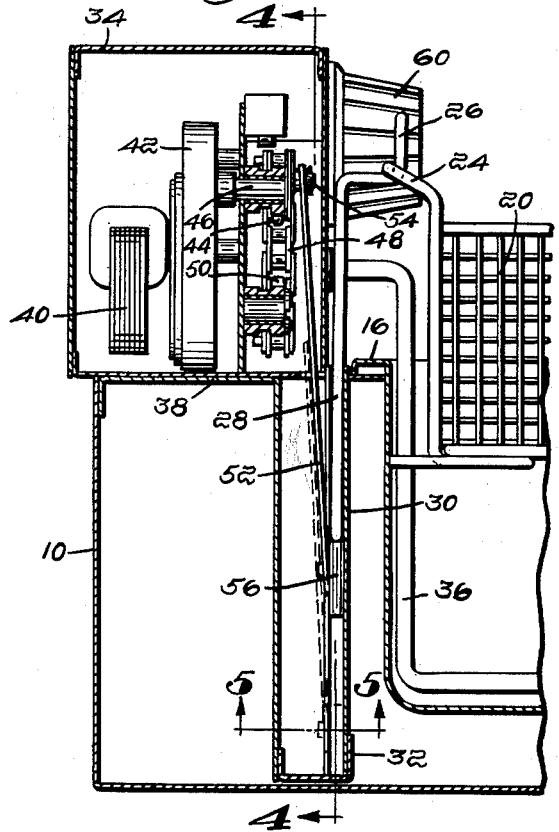
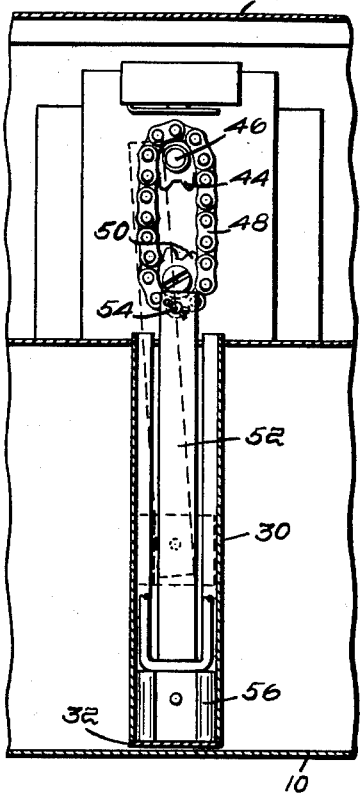
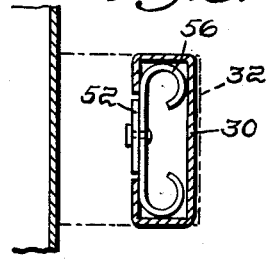

Aug. 20, 1963    G. H. BUSHWAY    3,101,043
COOKING MACHINE
Filed June 22, 1961    3 Sheets-Sheet 3

Inventor:
George H. Bushway,
by
Attorney

United States Patent Office 3,101,043
Patented Aug. 20, 1963

3,101,043
COOKING MACHINE
George H. Bushway, S. Road, Rye Beach, N.H.
Filed June 22, 1961, Ser. No. 118,964
2 Claims. (Cl. 99—407)

This invention relates to cooking machines of the nature shown in Patent 2,215,929, commonly called deep fat fryers and adapted to cook various edible products in an oil bath. The machine employs a cooking tank together with a foraminous basket for supporting the product within the bath. The bath is heated electrically and the machine can be constructed to operate either manually or automatically. Such machines under thermostatic control are known in the art, and my invention herein relates more particularly to an improvement of such a cooking machine shown in my Patent 2,868,112.

Cooking machines of this type require frequent and thorough washing and cleaning and this operation is substantially facilitated by compact construction of my invention permitting the quick removal of all operating parts and electric controls from the cooking parts of the machine that require washing. My improved machine embodies a compact unit containing the entire control, power and heating elements of the machine and so mounted that it can be instantly removed, thus permitting free and complete washing of the cooking parts without exposing the operating parts to water damage and more particularly the electrical parts to danger of shock to the operator during the cleaning operation, all as hereinafter more specifically described.

These and other features of the invention will be better understood from the following description of an embodiment thereof selected for purposes of illustration and shown in the accompanying drawings in which—

FIG. 1 is a perspective view of a cooking machine embodying the invention,

FIG. 2 is an elevation of the machine mostly in vertical section.

FIG. 3 is an enlarged fragmentary view of FIG. 2 with the parts in raised position, FIG. 4 is a fragmentary front elevation of adjacent parts shown in FIG. 3, FIG. 5 is a fragmentary sectional view taken on line 5—5 of FIG. 3.

Figure 6:
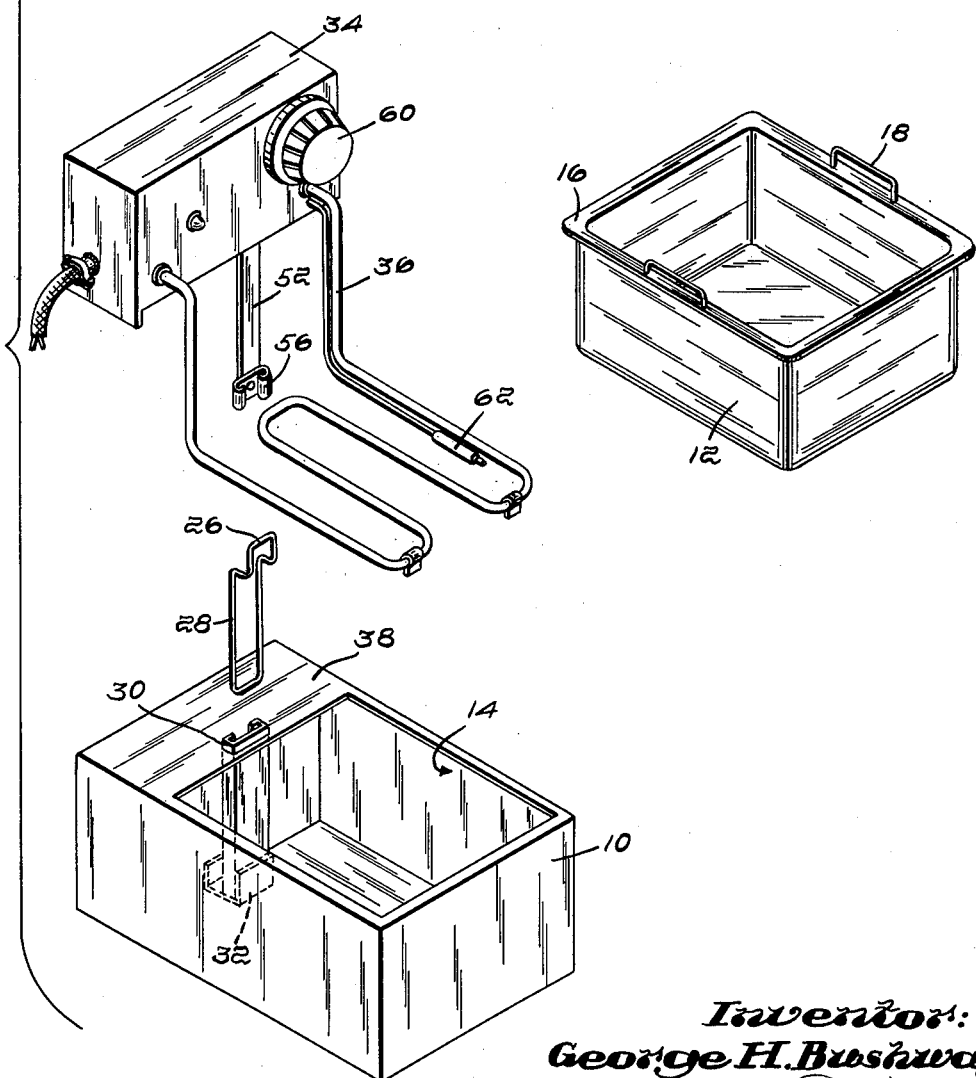
FIG. 6 is a view of cooperating parts in disassembled relation.

In the drawings 10 indicates a box-like casing preferably of sheet metal and open vertically therethrough to receive thereinto a cooking tank 12. The tank substantially corresponds in size and shape to the top opening 14 to slide vertically therein and is provided with an outwardly extending marginal rim 16 adapted to rest on the casing at the margin of the opening to support the tank within the casing. Lifting handles 18 are provided on the tank.

A foraminous basket 20 of a size and shape to fit within the tank is provided for receiving and supporting products to be cooked. A lifting handle 22 is affixed to one side of the basket and a supporting loop 24 is fixed to the top margin at the opposite side. The loop is adapted to be engaged over a member 26 for supporting the basket on the casing and within the tank. The member 26 illustrated in the drawing comprises a wire loop having two relatively long legs 28 extending downwardly within a vertical guideway 30 housed within the casing adjacent to the opening 14 and supported on a bracket 32 therein.

My improved cooking machine herein described comprises four main parts shown in disassembled relation in FIG. 6, three of such parts being the base member 10, the tank 12 and the basket 20 which are adapted to contain the product being cooked and require frequent and thorough washing and cleaning. The fourth part comprises a single unit including a box 34 carrying the basket lifting and control mechanism therein and the electric heater 36. The base member or casing 10 extends beyond one end of the opening 14 thereinto and provides an area 38 along one margin of the opening at the top wall portion of the member for receiving and supporting the box 34 thereon in the position illustrated in FIGS. 1–3.

The basket lifting mechanism within the box 34 includes an electric motor 40, gearing within a gear box 42, a sprocket 44 on a shaft 46, and an endless chain 48 on the sprocket 44 and a cooperating sprocket 50. A link 52 on a stud 54 carried by the chain extends downwardly from the box and carries a laterally extending abutment 56 on its bottom and adapted to slide downwardly into the vertical guideway 30. The member 26 is adapted also to slide within the guide and rest on the abutment 56. An electric power cable 58 to the motor and heater extends into the box 34 and a graduated dial 60 is provided for setting the thermostat 62 to the cooking temperature desired.

The cooking is automatically performed substantially as described in my said Patent 2,868,112 and in Patent 2,215,929. At the start of the cooking operation the parts are in the position of FIG. 2. When the cooking is completed the thermostat automatically cuts off the heat and starts the motor which thereupon raises the basket to the draining position of FIG. 3. The parts remain in this position ready to perform the next cooking operation.

It will now be apparent that I have provided a novel and compact construction wherein the entire control, power and electrical elements are embodied in a removable unit leaving the cooking containers free to be washed and cleaned and without exposing the power and control elements. It will also be noted that danger of electric shock to the operator during the cleaning operation has been eliminated.

I claim:

1. A cooking machine comprising a base member, a cooking tank removably supported thereon, a foraminous basket removably disposed within the tank, means providing a vertically extending guideway carried by the base member, a box comprising a unit independent of and removably supported on the base member, power operated means carried by said box and including an electric motor and a member disposed to slide vertically on the guideway for lifting the basket, an electric heating unit carried by the box in position extending downwardly into the tank beneath the basket, an electric power cable to the motor and heating unit extending into the box, and control means for the motor and heating unit carried by the box, the box together with the heating unit and control and power means being removable from the base member as a unit and permitting thorough washing and cleaning of the base member independently of the electric power cable, control means and motor.

2. A cooking machine comprising a box-like base member having an opening downwardly thereinto through its top wall and a supporting shelf area along one margin of said opening, a cooking tank removably disposed within the opening, a foraminous basket removably disposed within the tank, means providing a vertically extending guideway in the base member adjacent to said opening, a control and power box removably supported on said shelf area, power operated means carried by said box and including an electric motor and a member disposed to slide vertically on the guideway for lifting the basket, an electric heating unit carried by the box in position extending downwardly into the tank beneath the basket, an electric power cable to the motor and heating unit extending into the box, and control means for the motor and heating unit carried by the box, the box together with the heating unit and control and power means being removable from the base member as a unit and permitting thorough washing and cleaning of the base member independently of the electric power cable, control means and motor.

References Cited in the file of this patent

UNITED STATES PATENTS

| | | |
|---|---|---|
| 2,735,355 | Brenner | Feb. 21, 1956 |
| 2,868,112 | Bushway | Jan. 13, 1959 |
| 2,903,958 | Laurent | Sept. 15, 1959 |